(12) United States Patent
Suo et al.

(10) Patent No.: US 8,660,103 B2
(45) Date of Patent: Feb. 25, 2014

(54) WIRELESS ROUTING DEVICE

(75) Inventors: Jiangbo Suo, Shenzhen (CN); Jie Yang, Shenzhen (CN); Peng Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/576,662

(22) PCT Filed: Jul. 21, 2010

(86) PCT No.: PCT/CN2010/075364
§ 371 (c)(1),
(2), (4) Date: Aug. 2, 2012

(87) PCT Pub. No.: WO2011/116574
PCT Pub. Date: Sep. 29, 2011

(65) Prior Publication Data
US 2012/0307816 A1    Dec. 6, 2012

(30) Foreign Application Priority Data
Mar. 23, 2010 (CN) .......................... 2010 1 0140616

(51) Int. Cl.
*H04W 88/14* (2009.01)
(52) U.S. Cl.
USPC ............................ 370/338; 370/311; 370/351
(58) Field of Classification Search
USPC ............................ 370/311, 338, 351; 455/522
See application file for complete search history.

(56) References Cited

U.S. PATENT DOCUMENTS

| 7,412,020 B1 | 8/2008 | Misra |
| 7,529,529 B2 | 5/2009 | Taylor |
| 2004/0174900 A1* | 9/2004 | Volpi et al. ..................... 370/466 |
| 2005/0080973 A1* | 4/2005 | Lee ................................ 710/311 |

(Continued)

FOREIGN PATENT DOCUMENTS

| CN | 101252717 A | 8/2008 |
| CN | 101801123 A | 8/2010 |

OTHER PUBLICATIONS

International Search Report in international application No. PCT/CN2010/075364, mailed on Dec. 30, 2010.

(Continued)

*Primary Examiner* — Ian N Moore
*Assistant Examiner* — Phong La
(74) *Attorney, Agent, or Firm* — Oppedahl Patent Law Firm LLC

(57) ABSTRACT

The disclosure discloses a wireless routing device. The device include: a wideband wireless access module configured to implement wireless access of wideband data; an embedded operating system software module, embedded in the wideband wireless access module, configured to enable a user to access a wireless local area network (WLAN), and to forward the wideband data received from the wideband wireless access module to a WLAN communication module; the wireless local area network communication module is configured to receive the wideband data and to enable users in the WLAN to share the wideband data; and a power supply module configured to supply power for the wideband wireless access module and the wireless local area network communication module. The disclosure adequately utilizes the hardware resources of the wideband wireless access module, and saves a hardware of an independent Access Point (AP) Router processor module so that the hardware structure is simpler, the power consumption is lower during the normal standby and operation, and meanwhile the lasting time of the battery mode is longer, and the portability and the mobility of the wireless route product are improved.

20 Claims, 2 Drawing Sheets

(56) References Cited

U.S. PATENT DOCUMENTS

| | | | |
|---|---|---|---|
| 2006/0199562 A1 | 9/2006 | Taylor | |
| 2007/0088830 A1 | 4/2007 | Borella | |
| 2007/0110017 A1* | 5/2007 | Fulknier et al. | 370/338 |
| 2007/0142098 A1* | 6/2007 | Behzad et al. | 455/574 |
| 2008/0117860 A1 | 5/2008 | Rodriguez | |
| 2008/0148402 A1* | 6/2008 | Bogineni et al. | 726/22 |
| 2008/0259841 A1 | 10/2008 | Deshpande | |
| 2008/0263647 A1* | 10/2008 | Barnett et al. | 726/6 |
| 2009/0086660 A1* | 4/2009 | Sood et al. | 370/311 |
| 2009/0180451 A1* | 7/2009 | Alpert et al. | 370/338 |
| 2009/0257396 A1* | 10/2009 | Eliezer et al. | 370/330 |
| 2009/0327754 A1* | 12/2009 | Sato | 713/189 |
| 2010/0069096 A1* | 3/2010 | Poola et al. | 455/466 |
| 2010/0115624 A1* | 5/2010 | Coppinger | 726/27 |
| 2010/0211979 A1* | 8/2010 | Konno et al. | 725/59 |
| 2010/0235433 A1* | 9/2010 | Ansari et al. | 709/203 |
| 2011/0019651 A1 | 1/2011 | Fulknier | |
| 2012/0281658 A1* | 11/2012 | Rikkinen et al. | 370/329 |

OTHER PUBLICATIONS

English Translation of the Written Opinion of the International Search Authority in international application No. PCT/CN2010/075364, mailed on Dec. 30, 2010.

Supplementary European Search Report in European application No. 10848236.5, mailed on Dec. 11, 2012.

\* cited by examiner

WIRELESS ROUTING DEVICE

TECHNICAL FIELD

The disclosure relates to the field of network communication devices, particularly to a wireless routing device.

BACKGROUND

With the development of personal wireless communication technology, more and more access modes to the cellular network of personal wireless wideband are merging and replacing the access of the World-Wide-Web, such as the traditional wired Asymmetric Digital Subscriber Line (ADSL), for increasingly obvious advantages. On the other hand, Wireless Fidelity (WiFi) as a wireless access mode has been widely applied on in PC, mobile phones, portable multimedia amusement devices and the like.

With the integration of wireless wideband technology and WiFi technology, a wireless routing device which implements wireless wideband access and WiFi LAN coverage by using 2G/3G wireless cellular technology has gradually emerged. This wireless routing device integrates a simple wireless Access Point (AP) and a wideband router. The product adopts the architecture as shown in FIG. 1 in most cases and includes a 2G/3G cellular access module, an AP router processor module, a WiFi module and a power supply module. In this architecture, an AP router processor includes an independent hardware module embedded with a router software module and a WiFi AP software module. This router processor is a dedicated or universal processor, and the system operated thereon is an embedded operating system, such as Linux. The existing wireless routing device has many hardware modules and the overall architecture is complex and the total power consumption during operation is high, therefore, a power adapter must be provided during use to connect an external power supply, and it is also difficult to implement long-time movable wireless router function by using batteries. As a result, the advantageous of portability and mobility of wireless wideband technology are sacrificed in implementing various functions of a wireless router.

SUMMARY

The embodiment of the disclosure provides a wireless routing device with a simple structure and lower power consumption, which includes:

a wideband wireless access module, configured to implement wireless access of wideband data;

an embedded operating system software module, embedded in the wideband wireless access module, configured to enable a user to access a wireless local area network (WLAN), and to forward the wideband data received from the wideband wireless access module to the WLAN communication module;

a WLAN communication module, configured to receive the wideband data and to enable users in the WLAN to share the wideband data; and a power supply module, configured to supply power for the wideband wireless access module and the WLAN communication module.

The embedded operating system software module in the wireless routing device provided by the embodiment of the disclosure may be further configured to initiate, after initialization of the embedded operating system, a Transmission Control Protocol/Internet Protocol (TCP/IP) master control task by invoking, through a system-built-in interface, a process in which a drive resides, to load a basic network protocol stack, and to enable the embedded operating system software module to perform a routing function of forwarding the wideband data.

The embedded operating system software module in the wireless routing device provided by the embodiment of the disclosure may be further configured to load a drive of the WLAN communication module after initialization of the embedded operating system, so as to enable the user to access the WLAN.

Further, the wireless routing device provided by the embodiment of the disclosure may further include a power management software module, configured to manage powering on and off of the wideband wireless access module and the WLAN communication module, and to manage charging and use of a power supply.

Further, the wireless routing device provided by the embodiment of the disclosure may further include a device management software module, configured to perform parameter setting of the wideband wireless access module and the WLAN communication module, and network management and configuration of the WLAN.

The wideband wireless access module in the wireless routing device provided by the embodiment of the disclosure may take at least one of the following wireless access modes: General Packet Radio Service (GPRS), Code Division Multiple Access (CDMA), Time Division-Synchronization Code Division Multiple Access (TD-SCDMA), Wideband Code Division Multiple Access (WCDMA), Enhanced Data Rate for Global Evolution (EDGE), High-Speed Packet Access (HSPA) and Long-Term Evolution (LTE).

The WLAN communication module in the wireless routing device provided by the embodiment of the disclosure may be a Wireless Fidelity (WiFi) data communication module.

The embedded operating system software module in the wireless routing device provided by the embodiment of the disclosure may be a Rex operating system.

The power supply module in the wireless routing device provided by the embodiment of the disclosure may be the combination of a power adapter and a rechargeable battery, or may be a rechargeable battery.

The embodiment of the disclosure has the following beneficial effects:

the wireless routing device provided by the embodiment of the disclosure includes: a wideband wireless access module, an embedded operating system software module, a WLAN communication module and a power supply module, wherein the wideband wireless access module is configured to implement wireless access of wideband data; the embedded operating system software module is embedded in the wideband wireless access module, configured to enable a user to access an WLAN, and to forward the wideband data received from the wideband wireless access module to a WLAN communication module; the WLAN communication module is configured to receive the wideband data and to enable users in the WLAN to share the wideband data; and the power supply module is configured to supply power for the wideband wireless access module and the WLAN communication module. The wireless routing device provided by the embodiment of the disclosure is embedded with an embedded operating system software module on the basis of wideband wireless access module hardware. The embedded operating system software module can implement WLAN access and router function at the same time. Compared with the related art, the wireless routing device provided by the disclosure adequately utilizes the hardware resources of the wideband wireless access module, and saves a hardware of an independent Access Point (AP) Router processor module so that the hardware structure is simpler, the power consumption is lower during the normal standby and operation, and meanwhile the lasting time of the battery mode is longer, and the portability and the mobility of the wireless route product are improved.

DETAILED DESCRIPTION OF THE EMBODIMENTS

Now the embodiment of a wireless routing device provided by the disclosure is described in details by referring to the accompanying drawings.

Figure 1:
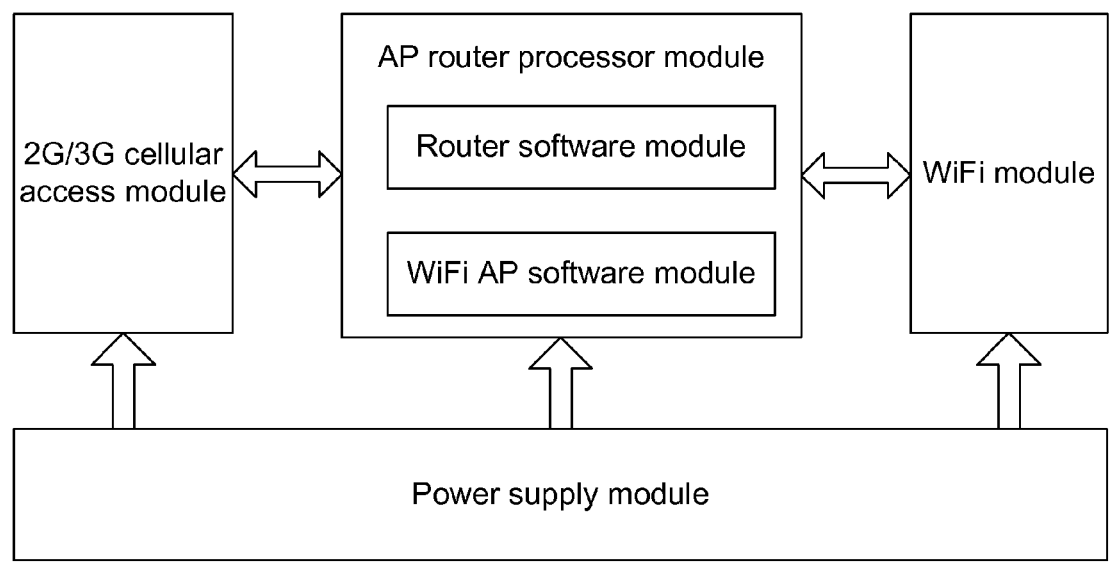
FIG. 1 is a structural schematic of an existing wireless routing device.
Figure 2:
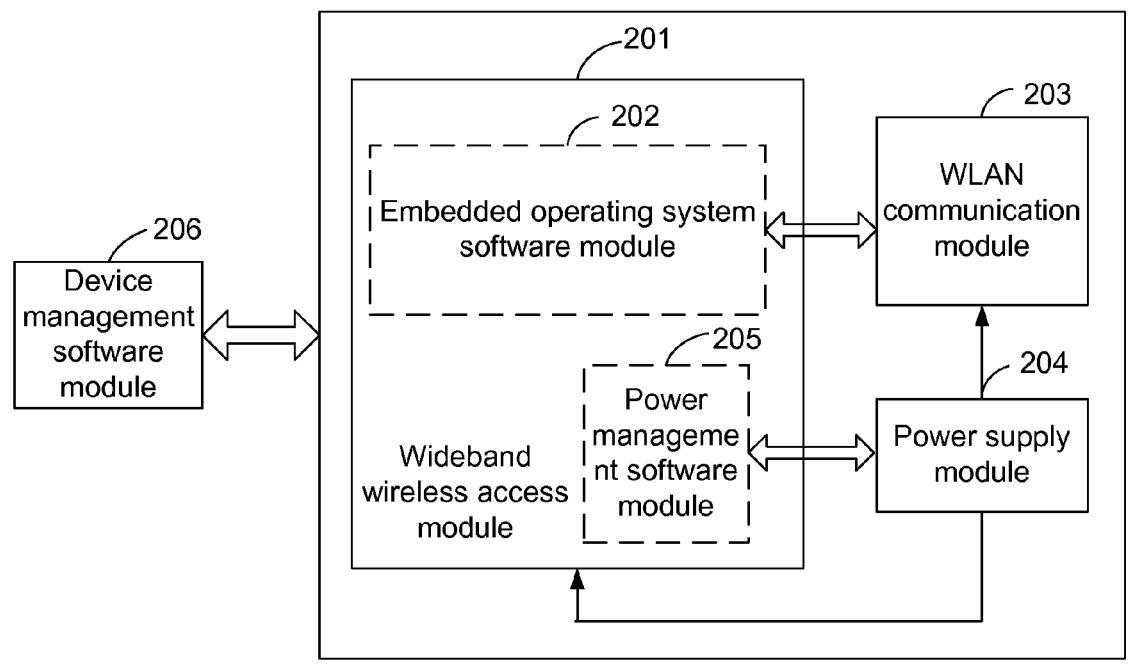
FIG. 2 is a structural schematic of a wireless routing device provided by an embodiment of the disclosure.

The wireless routing device provided by an embodiment of the disclosure, as shown in FIG. 2, includes: a wideband wireless access module 201, an embedded operating system software module 202, a wireless local area network (WLAN) communication module 203 and a power supply module 204, wherein the wideband wireless access module 201 is configured to implement wireless access of wideband data;

the embedded operating system software module 202 is embedded in the wideband wireless access module 201, configured to enable a user to access a WLAN, and to forward the wideband data received from the wideband wireless access module 201 to the WLAN communication module 203;

the WLAN communication module 203 is configured to receive the wideband data and to enable users in the WLAN to share the wideband data; and the power supply module 204 is configured to supply power for the wideband wireless access module 201 and the WLAN communication module 203.

Every module of the wireless routing device provided by an embodiment of the disclosure is described in details as follows.

The wideband wireless access module 201 is a module responsible for wireless communication function. This module may takes various communication modes to implement wideband data access, for example: GPRS (General Packet Radio Service), CDMA (Code Division Multiple Addressing), TD-SCDMA (Time Division-Synchronous Code Division Multiple Access), WCDMA (Wideband CDMA), EDGE (Enhanced Data rate for Global Evolution), HSPA (High-Speed Packet Access), LTE (Long-Term Evolution) and other wireless wideband data access modes.

In the embodiment of the disclosure, the WLAN communication module 203 may be a Wireless Fidelity (WiFi) data communication module, or any other network-based WLAN data communication module. Below it is described by taking a WiFi data communication module as an example.

In terms of hardware resources, the wideband wireless access module 201 should be able to bear the development of various functions of an embedded operating system, including providing corresponding CPU resources and memory resources for the embedded operating system software module. Through developing the hardware of the wideband wireless access module 201, the embedded operating system software module 202 may be embedded. In the embodiment of the disclosure, preferably, the embedded operating system software module 202 adopts a Rex (Real-Time Executive) operating system from Qualcomm. Of course, the embodiment of the disclosure may also adopt other embedded operating systems. The embodiment of the disclosure sets no limitation to it.

The existing Rex operating system is a simple, efficient and energy-saving real-time operating system, which is designed exclusively for small embedded systems and supports multitasks. It provides API (Application Program Interface) for task control, task synchronization, exclusion, timer and control interruption and is widely applied in many wideband wireless access modules based on ARM (Advanced RISC Machines) microprocessor. In the embodiment of the disclosure, the embedded operating system software module 202 which is a Rex embedded operating system implements function of accessing WLAN, such as WiFi Access Point (AP) function, and Router function. Below it is explained by taking Rex embedded operating system for example.

Concretely speaking, the embedded operating system software module 202 is provided by an embodiment of the disclosure implements router function in the following way:

after initialization of the Rex operating system, the embedded operating system software module 202 initiate a Transmission Control Protocol/Internet Protocol (TCP/IP) master control task by invoking a process in which a drive resides through a system-built-in interface. Once the foregoing process is completed, the basic network drive task is implemented (also the router function is implemented). The basic network protocol stack includes but not limited to the following related protocols: TCP, User Datagram Protocol (UDP), IP, Internet Control Message Protocol (ICMP), Network Address Translation (NAT) protocol, Network Address Port Translation (NAPT) protocol, Dynamic Host Configuration (DHCP) server protocol, Address Resolution Protocol (ARP), Domain Name System (DNS) relay protocol, Domain Name System (DNS) client protocol, DNS extensions to Network Address Translators (DNS_ALG), port Filter protocol, port Forwarding protocol, Internet Group Management Protocol (IGMP) Snooping protocol and IGMP Proxy protocol.

The embedded operating system software module 202 provided by an embodiment of the disclosure implements the function of accessing WLAN, such as WiFi Access Point in the following way:

after initialization of the Rex operating system, the drive of the WiFi data communication module is loaded. The WiFi data communication module is loaded to the Rex operating system, thus enabling the WiFi AP function. After the WiFi AP function is enabled, the related parameters and security of the WiFi AP function may be configured through the Rex operating system in the embedded operating system software module 202.

The WiFi AP function implemented by the embedded operating system software module includes but not limited to: Host driver, Soft AP, Authenticator, Config and etc.

In the Rex operating system, Router function and WiFi AP function may be implemented at the same time and have no conflict and locking.

The wideband wireless access module 201 in the wireless routing device provided by an embodiment of the disclosure implements access of wideband data from a cellular network. Under the coordination of the embedded operating system software module 202 and the WLAN communication module 203, WLAN users access through the way of WLAN such as WiFi, to share the access bandwidth of the wideband wireless access module 201 and implement high-speed access of World Wide Web (WWW).

Further, the wireless routing device provided by an embodiment of the disclosure, as shown in FIG. 2, also includes: a power management software module 205, configured to manage powering on and off of the wideband wireless access module and the WLAN communication module (WiFi data communication module), and to manage charging and use of the power supply. Preferably, the power management module 205 is set and operated in the wideband wireless access module 201.

The wireless routing device provided by an embodiment of the disclosure may adopt the following two power supply modes. The first is supply power from the combination of an external power supply and a battery. For example, during normal work, an external power supply connected via a power adapter is used to supply power for all modules and meanwhile to charge the battery. As wireless routing device provided by an embodiment of the disclosure adopts simple hardware design, energy consumption of the hardware is reduced. While all modules are supplied with power, the remaining electricity can meet the need of battery charging. When the wireless routing device needs to be movable, the power may be supplied directly from the battery to meet the need of portability. The other power supply mode is to directly supply power from a battery. Under the mode of power supply from a battery, the power management module accordingly has such functions as battery power detection and low power alarm. The foregoing two power supply modes both greatly improve equipment portability and meet the requirement of the wireless routing device on mobility.

Further, the wireless routing device provided by an embodiment of the disclosure, as shown in FIG. 2, also includes: a device management software module 206, configured to perform parameter setting of the wideband wireless access module 201 and the WLAN communication module 203, and network management and configuration of the WLAN.

The device management software module may be set and operated on the PC used by the wireless routing device administrator. The wireless routing device administrator may perform the parameter setting of the wideband wireless access module 201 and the WLAN communication module 203, and network management and configuration of the WLAN through this module.

Through the setting of the wideband wireless access module 201 and the WLAN communication module 203 by the device management module, the wireless routing device provided by an embodiment of the disclosure may implement two operating modes. One is to disable the access function of wideband data of the wideband wireless access module 201 and enable the embedded operating system software module and the WLAN communication module. This wireless routing device serves as an AP of the WLAN, thereby forming a pure WLAN.

The other mode is to disable the embedded operating system software module and the WLAN communication module, use a wireless router card as a pure data card and implement exclusive use of wireless wideband data by a single computer.

Compared with the related art, the foregoing wireless routing device provided by an embodiment of the disclosure has simpler hardware structure. It is verified that because the wireless routing device provided by an embodiment of the disclosure has a simplified hardware structure, the power consumption of the device during standby and normal use is reduced by more than 20%, thereby making power supply from a battery possible and improving the portability and the mobility of the wireless routing device.

The wireless routing device provided by an embodiment of the disclosure includes: a wideband wireless access module, an embedded operating system software module, a WLAN communication module and a power supply module. The wideband wireless access module is configured to implement wireless access of wideband data. The embedded operating system software module is embedded in the wideband wireless access module, configured to enable a user to access a wireless local area network (WLAN), and to forward the wideband data received from the wideband wireless access module to the WLAN communication module. The WLAN communication module is configured to receive the wideband data and to enable users in the WLAN to share the wideband data. The power supply module is configured to supply power for the wideband wireless access module and the WLAN communication module. The wireless routing device provided by the embodiment of the disclosure is embedded with an embedded operating system software module on the basis of wideband wireless access module hardware. The embedded operating system software module can implement WLAN access and router function at the same time. Compared with the related art, the disclosure adequately utilizes the hardware resources of the wideband wireless access module, and saves a hardware of an independent Access Point (AP) Router processor module so that the hardware structure is simpler, the power consumption is lower during the normal standby and operation, and meanwhile the lasting time of the battery mode is longer, and the portability and the mobility of the wireless route product are improved.

Apparently, those skilled in the art can make various changes and modifications to the disclosure without departing from the spirit and scope of the disclosure. If such changes and modifications of the disclosure are within the scope of claims of the disclosure and equivalent technology, the disclosure also intends to cover these changes and modifications.

The invention claimed is:

1. A wireless routing device, comprising: a wideband wireless access module, an embedded operating system software module, a wireless local area network (WLAN) communication module and a power supply module, wherein
    the wideband wireless access module is configured to implement wireless access of wideband data and provide corresponding CPU resources and memory resources for the embedded operating system software module;
    the embedded operating system software module is embedded in the wideband wireless access module, configured to enable a user to access a WLAN, and to forward the wideband data received from the wideband wireless access module to the WLAN communication module;
    the WLAN communication module is configured to receive the wideband data from the embedded operating system software module and to enable users in the WLAN to share the wideband data; and
    the power supply module is configured to supply power for the wideband wireless access module and the WLAN communication module,
    wherein the embedded operating system software module is a Rex operating system;
    the wireless routing device disposed to set the wideband wireless access module and the WLAN communication module to implement first and second operating modes;
    in the first operating mode, the access function of wideband data of the wideband wireless access module being disabled and the embedded operating system software module and the WLAN communication module being enabled;
    in the second operating mode, the embedded operating system software module and the WLAN communication module being disabled, and a single computer being provided exclusive wideband wireless access via the wideband wireless access module;

the embedded operating system software module capable of implementing WLAN access function and router function at the same time;

whereby in said first mode said wireless routing device serves as an access point of the WLAN, thereby forming a pure WLAN.

2. The wireless routing device as in claim 1, wherein the embedded operating system software module is further configured to initiate, after initialization of the embedded operating system, a Transmission Control Protocol/Internet Protocol (TCP/IP) master control task by invoking, through a system-built-in interface, a process in which a drive resides, to load a basic network protocol stack, and to enable the embedded operating system software module to perform a routing function of forwarding the wideband data.

3. The wireless routing device as in claim 1, wherein the embedded operating system software module is further configured to load a drive of the WLAN communication module after initialization of the embedded operating system, so as to enable the user to access the WLAN.

4. The wireless routing device as in claim 1, further comprising a power management software module, configured to manage powering on and off of the wideband wireless access module and WLAN communication module, and to manage charging and use of a power supply.

5. The wireless routing device as in claim 1, further comprising a device management software module, configured to perform parameter setting of the wideband wireless access module and the WLAN communication module, and network management and configuration of the WLAN.

6. The wireless routing device as in claim 1, wherein the wideband wireless access module takes at least one of the following wireless access modes: General Packet Radio Service (GPRS), Code Division Multiple Access (CDMA), Time Division-Synchronization Code Division Multiple Addressing (TD-SCDMA), Wideband Code Division Multiple Access (WCDMA), Enhanced Data Rate for Global Evolution (EDGE), High-Speed Packet Access (HSPA) and Long Term Evolution (LTE).

7. The wireless routing device as in claim 1, wherein the WLAN communication module is a Wireless Fidelity (WiFi) data communication module.

8. The wireless routing device as claim 1, wherein the power supply module is:
a combination of a power adapter and a rechargeable battery; or
a rechargeable battery.

9. The wireless routing device as in claim 2, wherein the wideband wireless access module takes at least one of the following wireless access modes: General Packet Radio Service (GPRS), Code Division Multiple Access (CDMA), Time Division-Synchronization Code Division Multiple Addressing (TD-SCDMA), Wideband Code Division Multiple Access (WCDMA), Enhanced Data Rate for Global Evolution (EDGE), High-Speed Packet Access (HSPA) and Long Term Evolution (LTE).

10. The wireless routing device as in claim 3, wherein the wideband wireless access module takes at least one of the following wireless access modes: General Packet Radio Service (GPRS), Code Division Multiple Access (CDMA), Time Division-Synchronization Code Division Multiple Addressing (TD-SCDMA), Wideband Code Division Multiple Access (WCDMA), Enhanced Data Rate for Global Evolution (EDGE), High-Speed Packet Access (HSPA) and Long Term Evolution (LTE).

11. The wireless routing device as in claim 4, wherein the wideband wireless access module takes at least one of the following wireless access modes: General Packet Radio Service (GPRS), Code Division Multiple Access (CDMA), Time Division-Synchronization Code Division Multiple Addressing (TD-SCDMA), Wideband Code Division Multiple Access (WCDMA), Enhanced Data Rate for Global Evolution (EDGE), High-Speed Packet Access (HSPA) and Long Term Evolution (LTE).

12. The wireless routing device as in claim 5, wherein the wideband wireless access module takes at least one of the following wireless access modes: General Packet Radio Service (GPRS), Code Division Multiple Access (CDMA), Time Division-Synchronization Code Division Multiple Addressing (TD-SCDMA), Wideband Code Division Multiple Access (WCDMA), Enhanced Data Rate for Global Evolution (EDGE), High-Speed Packet Access (HSPA) and Long Term Evolution (LTE).

13. The wireless routing device as in claim 2, wherein the WLAN communication module is a Wireless Fidelity (WiFi) data communication module.

14. The wireless routing device as in claim 3, wherein the WLAN communication module is a Wireless Fidelity (WiFi) data communication module.

15. The wireless routing device as in claim 4, wherein the WLAN communication module is a Wireless Fidelity (WiFi) data communication module.

16. The wireless routing device as in claim 5, wherein the WLAN communication module is a Wireless Fidelity (WiFi) data communication module.

17. The wireless routing device as in claim 2, wherein the power supply module is:
a combination of a power adapter and a rechargeable battery; or
a rechargeable battery.

18. The wireless routing device as in claim 3, wherein the power supply module is:
a combination of a power adapter and a rechargeable battery; or
a rechargeable battery.

19. The wireless routing device as in claim 4, wherein the power supply module is:
a combination of a power adapter and a rechargeable battery; or
a rechargeable battery.

20. The wireless routing device as in claim 5, wherein the power supply module is:
a combination of a power adapter and a rechargeable battery; or
a rechargeable battery.

* * * * *